United States Patent
King et al.

(10) Patent No.: US 6,180,001 B1
(45) Date of Patent: Jan. 30, 2001

(54) APPARATUS FOR SEPARATING LIGHT AND HEAVY PHASE LIQUIDS

(75) Inventors: F. Paul King, Royal Oak; Mark Inch, Romulus; Robert Howard, Ypsilanti, all of MI (US); Niels Bogh, Puyallup, WA (US)

(73) Assignee: Moco Thermal Industries, Incorporated, Romulus, MI (US)

( * ) Notice: Under 35 U.S.C. 154(b), the term of this patent shall be extended for 0 days.

(21) Appl. No.: 09/199,951

(22) Filed: Nov. 24, 1998

(Under 37 CFR 1.47)

(51) Int. Cl.[7] .................................................. B01D 17/02
(52) U.S. Cl. .................... 210/96.1; 210/103; 210/112; 210/115; 210/137; 210/143; 210/167; 210/181; 210/182; 210/251; 210/257.1; 210/258; 210/DIG. 5
(58) Field of Search .................. 210/96.1, 96.2, 210/103, 104, 109, 112, 115, 137, 143, 167, 181, 182, 257.1, 258, 251, 533, DIG. 5

(56) References Cited

U.S. PATENT DOCUMENTS

| | | | |
|---|---|---|---|
| 4,064,054 | * 12/1977 | Anderson et al. | 210/536 |
| 4,226,714 | * 10/1980 | Furness et al. | 210/723 |
| 4,680,109 | * 7/1987 | Yamada et al. | 210/103 |
| 4,722,611 | * 2/1988 | Hwltgren | 374/43 |
| 5,055,202 | * 10/1991 | Carroll et al. | 210/739 |
| 5,330,636 | * 7/1994 | Reichert | 210/DIG. 5 |
| 5,518,610 | * 5/1996 | Pierpoline | 210/DIG. 5 |
| 5,601,363 | * 2/1997 | Keil et al. | 374/45 |
| 5,635,074 | * 6/1997 | Stenstrom et al. | 210/739 |
| 5,725,775 | * 3/1998 | Bene et al. | 210/646 |
| 5,730,883 | * 3/1998 | Brown | 210/739 |
| 5,837,189 | 11/1998 | Westman | 266/131 |
| 5,918,473 | * 7/1999 | Gendron et al. | 62/129 |

OTHER PUBLICATIONS

L.M. Jarvis, R.R.Blackwood, "Thermal Separation of Polymer Quenchants for More Efficient Heat Treatments", Industrial Heating, Nov., 1989, pp. 23–24.

Robert, Howard, "Polyalkylene Glycol Concentration Control and Recovery Using Membrane Separation Technology", Despatch Industries, Feb., 1995, 1 p.

Robert, Howard, "Advancements in Aluminum Solution Heat Treatment Drop–Bottom Furnace Systems Increase Process Effectiveness", Industrial Heating, Feb. 1995, pp. 43–45.

* cited by examiner

Primary Examiner—Peter A. Hruskoci
(74) Attorney, Agent, or Firm—Harness, Dickey & Pierce, P.L.C.

(57) ABSTRACT

A quenchant management system having a quenchant separation module for separating a heavy phase polymer such as polyalkylene glycol (PAG) from water. The quenchant separation module includes a heating section for elevating the temperature of the fluid to be separated to provide initial thermal separation. The quenchant separation module also includes a coalescer for further separating the heavy phase from the light phase of the input fluid. In order to obtain a predetermined polymer concentration and the heavy phase, the output flow rate of the coalescer is varied in accordance with the concentration and flow rate of the input fluid.

29 Claims, 5 Drawing Sheets

| OPERATION | FLOW BLOCK VALVE REFERENCE NUMBER (1 = VALVE OPEN; VALVES ARE NORMALLY CLOSED) | | | | | | | | | | | | | | | | | | | | | | | PUMP REF. NUMBER (1 = PUMP ENGAGED) | | | | | |
|---|---|---|---|---|---|---|---|---|---|---|---|---|---|---|---|---|---|---|---|---|---|---|---|---|---|---|---|---|---|
| | 56 | 54 | 74 | 70 | 72 | 60 | 100 | 104 | 216 | 238 | 226 | 240 | 116 | 114 | 130 | 118 | 128 | 154 | 148 | 150 | 142 | 168 | 170 | 42 | 90 | 180 | 122 | 146 | 166 |
| QUENCH TANK FILTER/AGITATION | 1 | 1 | | | | | | | | | | | | | | | | | | | | | | 1 | | | | | |
| QUENCH TANK COOLING | | 1 | 1 | | | | | | | | | | | | | | | | | | | | | 1 | | | | | |
| QUENCH TANK TRANSFER TO PROCESS STORAGE TANKS | | | 1 | | | 1 | | | | | | | 1 | | | | | | | | | | | 1 | | | | | |
| RINSE TANK FILTER/AGITATION | | | | | | | | 1 | | | | | | | | | | | | | | | | | 1 | | | | |
| RINSE TANK TRANSFER TO PROCESS STORAGE TANKS | | | | | | | 1 | | | | | | 1 | 1 | 1 | 1 | | | | | | | | | 1 | | | | |
| PURGE/AGITATION CYCLE | | | | | | | | | | | | 1 | | | 1 | 1 | | | | | | | | | | 1 | | | |
| SEPARATION/AGITATION CYCLE | | | | | | | | | | 1 | 1 | | | | 1 | 1 | | | | | | | | | | 1 | 1 | | |
| PROCESS STORAGE TANKS AGITATION | | | | | | | | | | | | | 1 | | | 1 | | | | | | | | | | | 1 | | |
| PROCESS STORAGE TANKS TRANSFER TO QUENCH TANK | | | | | | | | | | | | | | 1 | | | | | 1 | 1 | | | | | | | | | |
| WATER STORAGE TANKS AGITATION | | | | | | | | | | | | | | | | | | 1 | | | | | | | | | | 1 | |
| WATER STORAGE TANKS TRANSFER TO QUENCH TANK | | | | | | | | | | | | | 1 | | | | 1 | | | | | | | | | | | 1 | |
| WATER STORAGE TANKS TRANSFER TO RINSE TANK | | | | | 1 | | | | | | | | | | | | 1 | | | | | | | | | | | 1 | |
| WATER STORAGE TANKS TRANSFER TO PROCESS STORAGE TANKS | | | | | | | | | | | | | 1 | 1 | | | | | | | | | | | | | | 1 | |
| WATER MAKE-UP | | | | | | | | | | | | | | | | | | | | | 1 | | 1 | | | | | | |
| P.A.G. STORAGE TANK AGITATION | | | | | | | | | | | | | | | | | | | | | | 1 | | | | | | | 1 |
| P.A.G. STORAGE TANK TRANSFER TO QUENCH TANK | | | | | | 1 | | | | | | | | | | | | | | | | | | | | | | | 1 |

*Fig-3*

APPARATUS FOR SEPARATING LIGHT AND HEAVY PHASE LIQUIDS

BACKGROUND OF THE INVENTION

1. Field of the Invention

The present invention relates to separation of light and heavy phase liquids and, more particularly, to varying the output flow of a separation apparatus in order to separate light and heavy phase liquids so that the heavy phase liquid is separated to a predetermined concentration.

2. Discussion

In metal fabrication systems, it is often desirable to heat treat the metals to be fabricated. Heat treatment typically involves controlled heating and cooling of the metal in the solid state in order to obtain specific, desired properties. The particular type of heat treating process depends upon the desired result and characteristics of the metal. One operation performed in the heat treatment process involves rapidly cooling metal in order to fabricate hard metal. This process is referred to as quenching. Quenching involves cooling the metal at a rate sufficient to form the desired metallurgical properties while minimizing residual stresses, distortion, and the possibility of cracking.

One particular quenching operation utilizes polymer quenchants. Polymer quenchants include solutions of organic polymers and water. The organic polymers contain corrosion inhibitors, as well as other additives, to produce a concentrated solution which is further diluted into a suitable quench solution. Examples of organic polymers used in polymer quenching operations include polyalkylene glycol (PAG), sodium polyacrylate (ACR), polyvinyl pyrrolidone (PVC), and other polymers. Because various polymer quenchants possess different properties, the selection of a particular polymer depends upon the desired quenching characteristics. The quenching characteristics can further be varied by selection of polymer concentration, temperature of the polymer, and the degree of agitation. Factors considered when selecting polymer quenchants include hardenability of the metal, thickness, and surface finish of the quenched metal, as well as other properties.

Polymer quenchants provide numerous advantages. Polymer quenchants are non-flammable, thereby significantly reducing the risk of fire and eliminating the need for expensive fire extinguishing systems. Polymer quenchants also provide a safer working environment by eliminating smoke and fumes during the quenching process and by eliminating the oily environments resulting from the use of more commonly used quenching oils. Polymer quenchants also provide numerous other technical advantages, as are known to those skilled in the art.

One particular advantage of polymer quenchants is that varied concentrations of the polymer quenchant provide flexibility of the quenching process to achieve a particular, desired result. Recently, some quenchant installations have included forms of quenchant management systems for varying the concentration of quenchant in the quench tank in order to vary the properties of the quenching operation. The quenchant management system receives fluid from the quench tank and recovers heavy and light phase components from the liquid received from the quench tank. The heavy phase component comprises the polymer quenchant in predetermined concentrations, and the light phase component comprises substantially water with a typical low level polymer quenchant concentration.

Existing quenchant management systems recover the polymer quenchants through thermal separation or through reverse osmosis. In thermal separation, the polymer quenchant is heated within a tank to cause separation into a heavy phase and a light phase which are then individually removed. While thermal separation may be relatively inexpensive, thermal separation does not provide the desired accuracy in the concentrations of the heavy and light phase components, requiring additional apparatus and operations to verify the concentrations of the recovered polymer. Reverse osmosis, on the other hand, is more accurate in the recovery of heavy and light phase components than thermal separation, but is much more expensive to manufacture and maintain.

Therefore, it is an object of the present invention to provide a quenchant management system which allows for accurate recovery of polymer quenchant in predetermined concentrations.

SUMMARY OF THE INVENTION

This invention is directed to an apparatus for separating an input fluid into a first phase liquid and a second phase liquid, the first phase liquid having a desired concentration of a selected component. The apparatus includes a device for measuring a concentration of the component in the input fluid and a flow meter for determining an input flow rate of the input fluid. A separator separates the input fluid into a first output fluid comprising the first phase liquid and a second output fluid comprising the second phase liquid, each output fluid having a flow rate from the separator. A first flow meter determines the flow rate of one of the first or second output fluids, and a first flow valve varies the flow rate of the first output fluid. A controller adjusts the first flow valve in accordance with the input flow rate, the input fluid concentration, and the desired concentration of the selected component.

This invention is also directed to a method for separating an input fluid into a first phase liquid and a second phase liquid, where the first phase liquid has a desired concentration of a selected component. The method includes the steps of determining a flow rate of the input fluid and determining the concentration of the selected component in the input fluid. The input fluid is passed through a separator to separate first phase liquid from the second phase liquid to provide a first output flow. The first output flow is made up of the first phase liquid, and a second output flow makes up the second phase liquid. A flow rate of one of the first or second output flows is determined. The flow rate of the first output flow is controlled in accordance with the concentration of the selected component in the input fluid, the flow rate of the input fluid, and the desired concentration of the selected component in the first phase liquid.

These and other advantages and features of the present invention will become readily apparent from the following detailed description, claims and drawings.

BRIEF DESCRIPTION OF THE DRAWINGS

The drawings, which form an integral part of the specification, are to be read in conjunction therewith, and like reference numerals are employed to designate similar components in the various views:

FIG. 3 is a process operation table detailing actuated components of FIG. 2 to carry out particular operations.

DETAILED DESCRIPTION OF THE INVENTION

Figure 1:
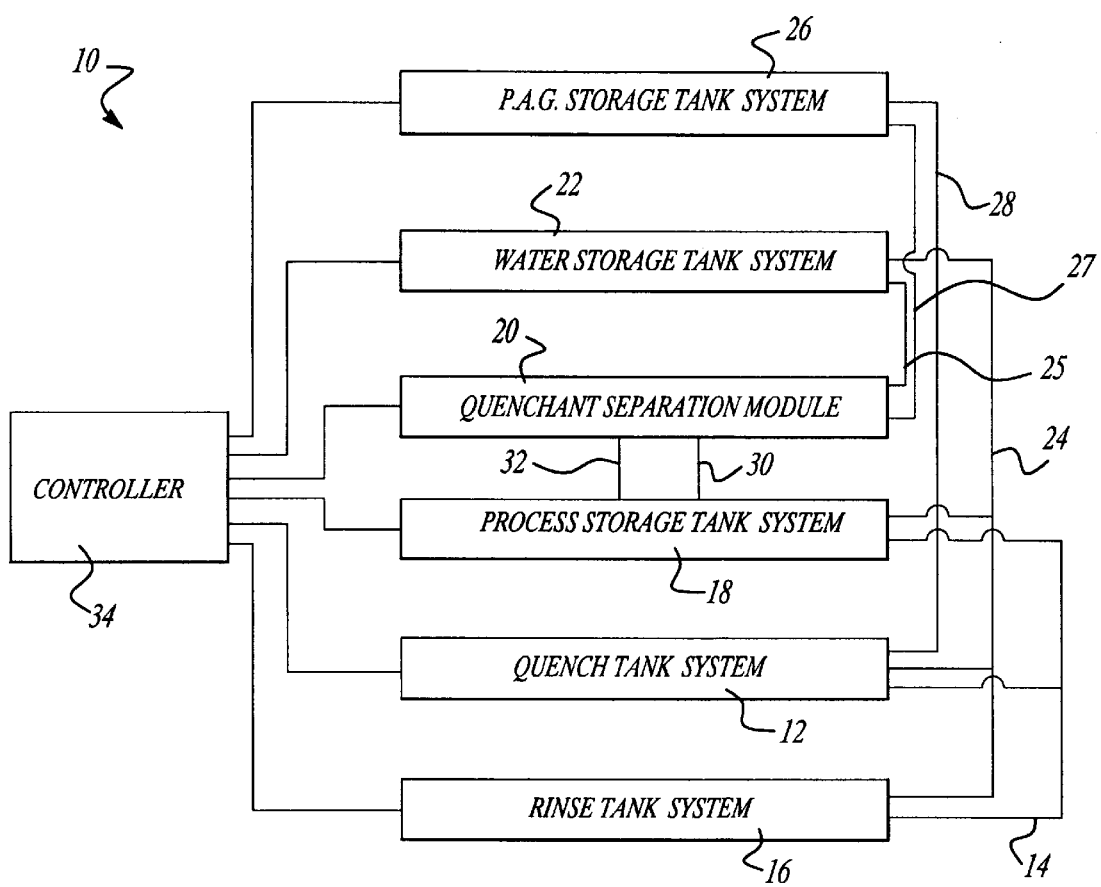
FIG. 1 is block diagram of the quenchant management system arranged in accordance with the principals of the present invention.
Figure 2A:
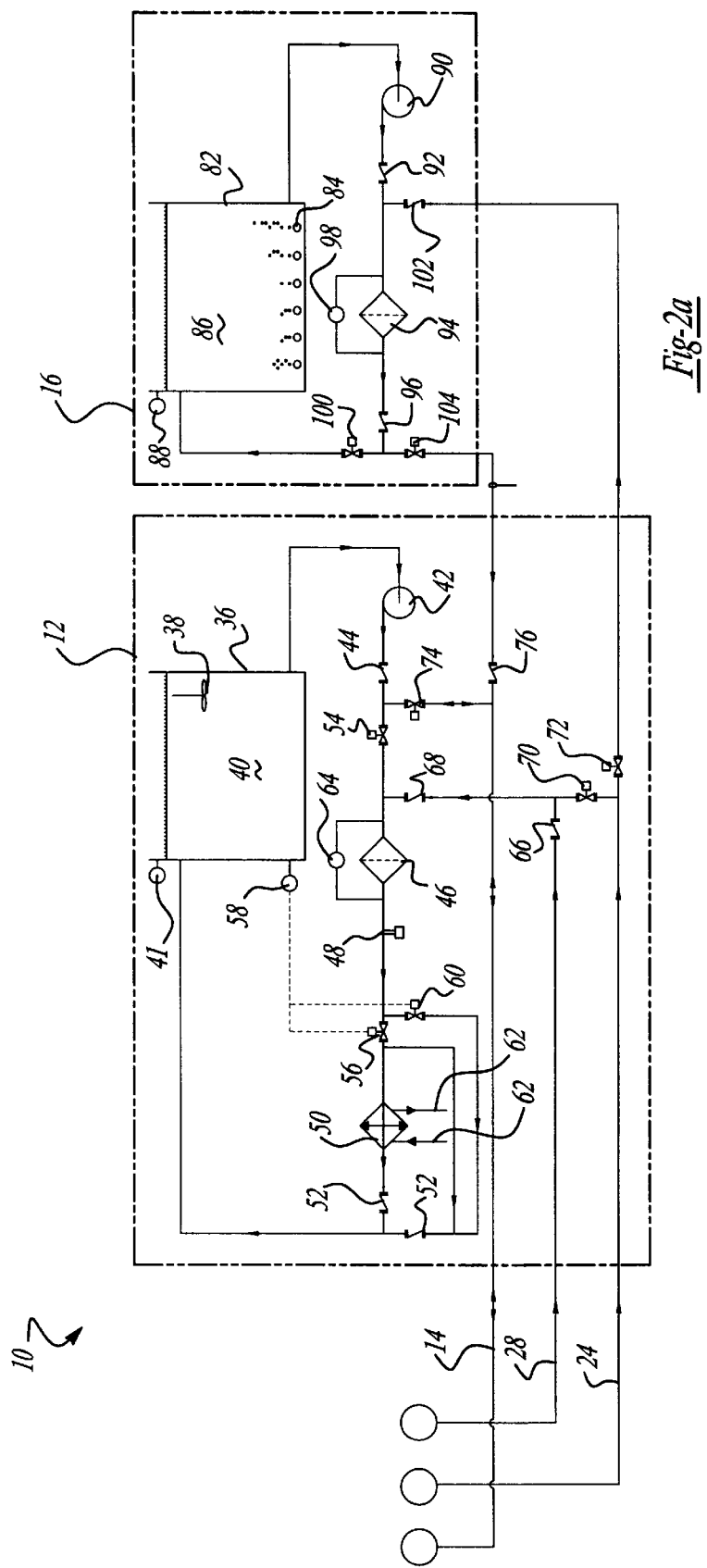
FIGS. 2a and 2b combine to form a schematic view of the quenchant management system of FIG. 1 arranged in accordance with the principals of the present invention.
Figure 2B:
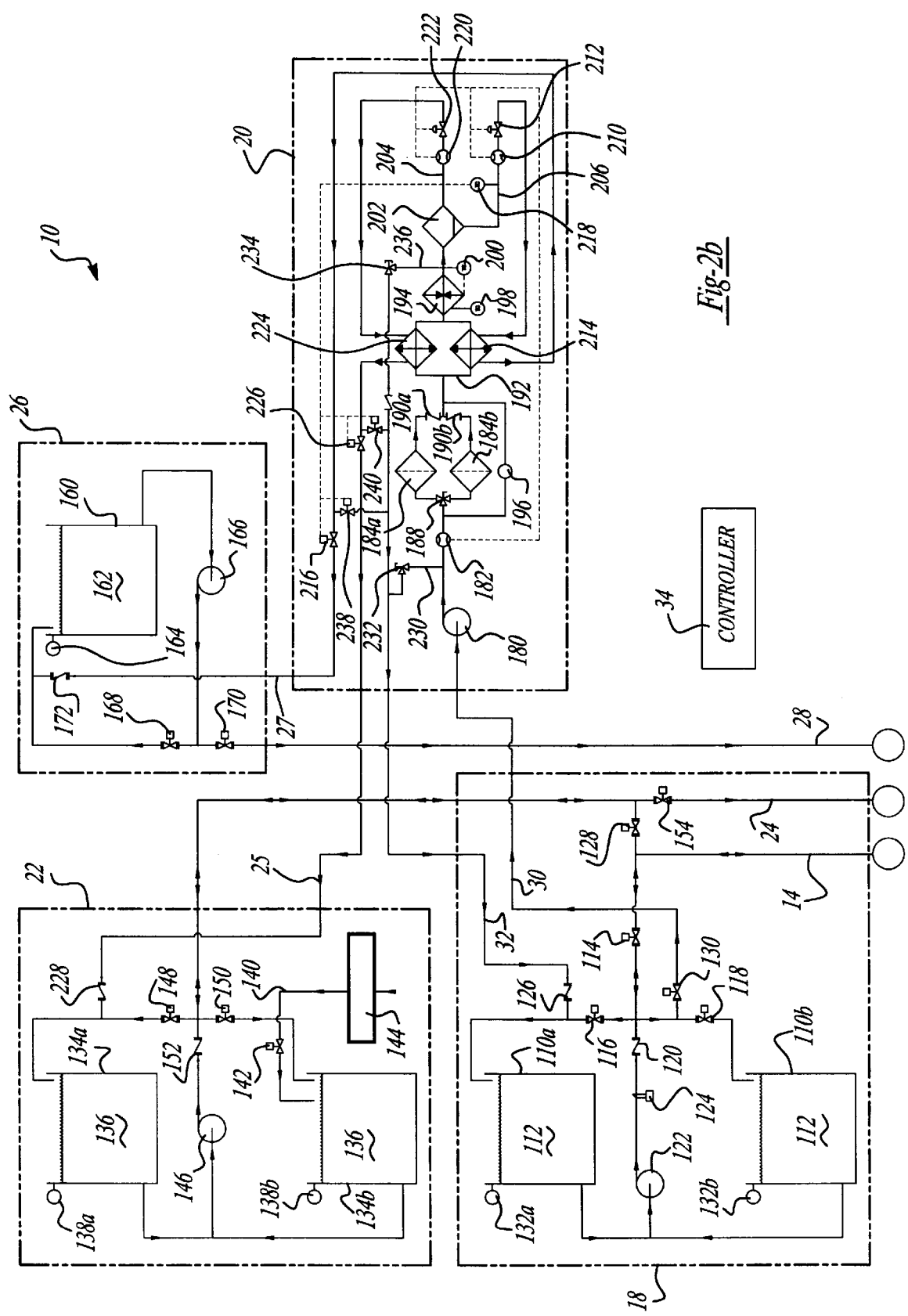

FIGS. 1, 2a, and 2b depict the quenchant management system 10 arranged in accordance with the principals of the present invention. Quenchant management system 10 includes a quench tank system 12 which holds quenchant solution in which a particular material is immersed in order to effect the quench process. Preferably, quench tank system 12 contains a solution of polymer quenchant, such as polyalkylene glycol (PAG). However, one skilled in the art will recognize that other organic polymers such as sodium polyacrylate (ACR), polyvinyl pyrrolidone (PVP), and polyethyl oxazoline (PEO) may be readily substituted for PAG. The present invention is particularly directed to a method and apparatus for separating PAG from quench and rinse solutions in predetermined concentrations. The purpose of this recovery process is to reuse the resultant products, i.e., PAG solution and water solution in various future quenching processes. Quench tank system 12 communicates with other modules and storage tank systems in the quenchant management system 10 through a plurality of fluid transmission lines. In particular, a process line 14 enables transfer of the quench solution between quench tank system 12 and process storage tank system 18 and transfer of rinse solution between rinse tank system 16 and process storage tank system 18. Rinse tank system 16 preferably contains a solution of less than 2% PAG and primarily contains water. In operation, the metal component immersed in and removed from quench tank system 12 is next immersed in rinse tank system 16 to rinse quench solution from the metal component.

Process storage tank system 18 receives via process line 14 quench solution removed from quench tank system 12 and rinse tank system 16. Process storage tank system 18 contains PAG solution received from the respective tanks for input to quenchant separation module 20 for recovery of a solution containing a predetermined concentration of PAG and a water solution containing less than approximately 2% by volume PAG which is stored in water storage tank system 22. Quench tank system 12, rinse tank system 16, process storage tank system 18, and water storage tank system 22 are interconnected by a water line 24 to enable transfer of water therebetween.

Quenchant separation module 20 outputs preferably a 50% by volume solution of PAG to PAG storage tank system 26 via PAG return line 27 and outputs preferably an approximately 2% by volume or less solution of PAG to water storage tank system 22 on water return line 25. Quench tank system 12, and PAG storage tank system 26 are interconnected by a PAG line 28 to enable transfer of PAG therebetween. Process storage tank system 18 outputs process fluid to quenchant separation module 20 via feed line 30, and quenchant separation module 20 outputs fluid to process storage tank system 18 via a purge line 32, as will be described in detail further herein. As will also be described further herein, a plurality of valves are arranged in each of the fluid transfer lines 14, 24, and 28 in order to enable to transfer of a selected fluid from a first selected tank system to a second selected tank system. A controller 34 is electronically connected to several electronic sensors, valves, and the like in order to receive and process electrical signals as input data and output control signals for controlling quenchant management system 10.

Referring to FIG. 2a, quench tank system 12 and rinse tank system 16 are shown in detail. Quench tank system 12 includes a quench tank 36 containing a PAG quench solution 40 of a predetermined concentration. An agitator 38 agitates quench solution 40 in order to maintain a homogeneous concentration. A level sensor 41 outputs to controller 34 an electrical signal that varies in accordance with the level quench solution 40 to indicate the level within the quench tank 36. Quench tank system 12 includes an input and recirculation circuit.

The input and circulation circuit includes a quench tank pump 42 which circulates fluid from quench tank 36 through a check valve 44, a filter 46, a process refractometer 48, a heat exchanger 50, and a check valve 52. The input and recirculation circuit also includes a flow block valve 54 which receives a control signal from controller 34 to enable or disable fluid flow through flow block valve 54. A pair of flow block valves 56 and 60 receives electrical signals from controller 34 in accordance with an output signal from a thermocouple 58. Thermocouple 58 outputs an electrical signal that varies in accordance with the temperature of quench solution 40. Flow block valves 56 and 60 operate in a complimentary manner based on the temperature of quench solution 40. When the temperature of quench solution 40 falls below a predetermined threshold, controller 34 outputs signals to close flow block valve 56 and open flow block valve 60 to bypass heat exchanger 50. Conversely, when the temperature of quench solution 40 rises above a predetermined threshold, controller 34 outputs control signals to open flow block valve 56 and close flow block valve 60 to circulate quench solution 40 through heat exchanger 50. Heat exchanger 50 reduces the temperature of quench solution 40. Heat exchanger 50 receives cooling water through cooling water pipes 62.

With respect to other components of the input and recirculation circuit, differential pressure switch 54 monitors the pressure differential between the input and output of filter 46. Differential pressure switch 54 provides a bypass of filter 46 when the pressure drop across filter 46 exceeds a predetermined threshold, indicating that filter 46 may require maintenance. Process refractometer 48 measures the concentration of fluid flowing through process refractometer 48 and outputs a signal to controller 34 in accordance with the concentration.

The input and recirculation circuit for quench tank system 12 enables the input of PAG solution from PAG line 28 or water from water line 24. The input and recirculation system also enables quench tank 36 to receive fluid from or drain fluid to process line 14. To receive PAG solution fluid from PAG line 28, PAG solution of a predetermined concentration flows from PAG storage tank system 26 through a plurality of flow valves, all to be described in detail herein, through a first check valve 66 and a second check valve 68. During this operation, Controller 34 outputs a control signal to open flow block valve 54. Similarly, water may be input to quench tank 36 from water storage tank system 22 through a plurality of flow valves, all to be described further herein, flow block valve 70, and check valve 68. During this operation, electrical controller 34 generates an output signal to open flow block valve 70.

It will be noted by one skilled in the art that fluid flow along PAG line 28 and water line 24 may only be into quench tank 36. With regard to process line 14, process line 14 can transfer fluid to quench tank 36 or receive fluid from quench tank 36. To input fluid to quench tank 36 from process line 14, controller 34 outputs control signals to open flow block valve 54 and flow block valve 74, thereby enabling fluid flow to quench tank 36 from process line 14. To drain fluid from quench tank 36 to process line 14, controller 34 outputs control signals to activate quench tank pump 42 and open flow block valve 103, thereby enabling fluid flow from quench tank 36 to process line 14. A check valve 76 prevents fluid from process line 14 from flowing to rinse tank system 16.

FIG. 2a also depicts rinse tank system 16. Rinse tank system 16 includes a rinse tank 82 which preferably contains a solution 86 comprised of water and minimal amounts of PAG. Rinse tank 82 includes air inlets 84 to enable air agitation of solution 86 in rinse tank 82. A level sensor 88 outputs a signal to controller 34 in accordance with the level of solution 86 in rinse tank 80. Similar to quench tank system 12, rinse tank system 16 includes an input and recirculation circuit. The input and recirculation circuit enables rinse tank system 16 fluid to drain rinse to process line 14 and to receive water from water line 24.

The input and recirculation circuit includes a rinse tank pump 90 which receives as input fluid drained from rinse tank 82. During recirculation, rinse tank pump 90 outputs fluid through check valve 92, filter 94, check valve 96, flow block valve 100, and rinse tank 82. Filter 94 includes a differential pressure switch 98 which operates as described with respect to differential pressure switch 64 quench tank system 12. To initiate recirculation, controller 34 outputs control signals to activate rinse tank pump 90 and open flow block valve 100, causing circulation through the recirculation circuit described above. To input fluid from water line 24 to rinse tank 82, controller 34 outputs control signals to open flow block valve 72 and flow block valve 100 to enable water flow into rinse tank 82 from water line 24 through check valve 102, filter 94, check valve 96, and flow block valve 100. In order to drain fluid from rinse tank 82 to process line 14, controller 34 outputs control signals to activate rinse tank pump 90 and open flow block valve 104, as well as other flow block valves in process storage tank system 18, as will be described herein.

Referring to FIG. 2b, the process storage tank system 18 will be described herein. Prior to describing process storage tank system 18 in detail it should be noted that process storage tank system 18 is described herein as a pair of process storage tanks which are interconnected but effectively function as one process storage tank. Utilization of a pair of process storage tanks interconnected depends upon specific design considerations, such as tank size requirements, which may dictate that a pair of process storage tanks should be used rather than one large process storage tank.

Process storage tank system 18 includes a pair of process storage tanks 110a, 110b which store process fluid 112 drained from quench tank 36 and rinse tank 82. Process storage tanks 110a, 110b include a respective pair of level sensors 132a, 132b which output electrical signals to controller 34. Process fluid 112 is output from and received by process storage tanks 110a, 110b via process line 14. During an input operation, controller 34 generates control signals to open flow block valves 114, 116, and 118. Fluid flow into process storage tank 110a occurs through flow block valves 114 and 116 via process line 14. Similarly, fluid flow into process storage tank 110b occurs through flow block valves 114 and 118 via process line 14. A check valve 120 prevents back flow into process storage tank pump 122. During fluid transfer from quench tank system 12 to process storage tank system 18, controller 34 outputs control signals to activate quench tank pump 42 and open flow block 74 to provide fluid flow into process line 14. During fluid transfer from rinse tank system 16 to process storage tank system 18, controller 34 generates control signals to activate rinse tank pump 90 and open flow block valve 104 to allow fluid to flow into process line 14.

Process storage tanks 110a, 110b are agitated in order to assure a homogeneous solution of process fluid 112. To effect agitation, controller 34 generates control signals to activate process storage tank pump 122 and to open flow block valves 116 and 118. During agitation, fluid flows from each process storage tank 110a, 110b into process storage tank pump 122, through a process refractometer 124, which measures the concentration of fluid flowing therethrough, through check valve 120, and each of flow block valves 116, 118 back to process storage tanks 110a, 110b, respectively. Check valve 126 prevents fluid flow during agitation into purge line 32.

Fluid in process storage tanks 110a, 110b may also be output to process line 14 for input to quench tank 36. To output fluid from process storage tanks 110a, 110b, controller 34 outputs control signals to activate process storage tank pump 122 and open flow block 114 to enable fluid flow to process line 14. As described above with respect to quench tank system 12, controller 34 also generates control signals to open flow block valves 74 and 54 thereby enabling fluid flow into quench tank 36.

Process storage tank system 18 also is configured to receive water from water storage tank system 22 on water line 24. To input water to process storage tanks 110a, 110b, controller 34 generates control signals to open flow block valves 128, 114, 116, and 118. Process storage tanks 110a, 110b are also configured to receive fluid from quench separation module 20 through purge line 32. To effect fluid flow from quenchant separation module 22 to process storage tanks 110a, 110b, controller 34 generates control signals to activate process storage tank pump 122 and open flow block valves 116, 118, and 130 while quenchant separation module 20 outputs fluid to purge line 32. Further yet, fluid may be transferred from process storage tanks 110a, 110b to quenchant separation module 20 to carry out the separation process. This fluid flow is initiated when controller 34 generates control signals to activate process storage tank pump 122 and open flow block valve 116, 118, and 130 to enable fluid flow from process storage tanks 110a, 110b to quenchant separation module 20.

Water storage tank system 22 is arranged similarly as described with respect to process storage tank system 18. More particularly, water storage tank system 22 includes a pair of water storage tanks 134a, 134b which contain a water solution 136 of preferably less than approximately 2% PAG concentration. A pair of level sensors 138a, 138b are arranged to determine the level of water solution 136 in water storage tanks 134a, 134b, respectively, and output electrical signals to controller 34 in accordance therewith. Water may be added to quenchant management system 10 via water storage tanks 134a, 134b through a water supply line 140 upon opening of flow block valve 142 by controller 34. Water supply line 140 includes a backflow preventor 144.

Also similar to process storage tank system 18, water storage tank system 22 includes an agitation circuit to enable agitation of water solution 136 to maintain a homogenous mixture. During agitation, controller 34 outputs control signals to activate water storage tank pump 146 and open flow block valves 148, 150. This enables fluid flow from each of storage tanks 134*a*, 134*b*, through water storage tank pump 146, check valve 152, and each of flow block valves 148, 150 for return to the water storage tanks 134*a*, 134*b*.

Water storage tank system 22 also outputs water to either of quench tank 36 or rinse tank 82. To enable water flow from water storage tanks 134*a*, 134*b* to either of quench tank 36 or rinse tank 82, controller 34 generates control signals to activate water storage tank pump 146 and open flow block valve 154 thereby enabling water to flow to either of quench tank system 12 or rinse tank system 16, depending upon operation of other flow block valves in quenchant management system 10. In particular, to enable input of water to quench tank 38, controller 34 generates control signals to open flow block valves 70 and 54. Similarly, to enable input of water to rinse tank 82, controller 34 generates control signals to open flow block valves 72 and 100 to enable water to flow into rinse tank 82. Water solution 136 may also be output to process storage system tank 18. To effect this operation, controller 34 generates control signals to activate water storage pump 146 and open flow block valves 128, 114, 116, and 118 to enable water flow into water storage tanks 110*a*, 110*b*.

PAG storage tank system 26 comprises a PAG tank 160 which contains PAG solution 162 which is preferably a 50% concentration of PAG. A level sensor 164 generates an output signal to controller 34 in accordance with the level of PAG solution 162 in PAG tank 160. PAG fluid 162 may be agitated to provide a homogenous solution. To effect agitation, controller 34 generates electrical control signals to activate PAG storage tank pump 166 and open flow block valve 168. PAG storage tank system 26 may also output PAG to PAG line 28 for input to quench tank 36. To output PAG fluid to quench tank 36, controller 34 generates control signals to activate PAG storage tank pump 166 and open flow block valve 170, thereby providing PAG solution 162 to PAG line 128. As discussed above with respect to quench tank system 12, controller 34 generates an electrical control signal to open flow block valve 54 to enable fluid flow of PAG from PAG storage tank 162 to quench tank 36. As will be described in greater detail herein, PAG solution which is output by quenchant separation module 20 is added to PAG storage tank 160 through PAG line 28 through check valve 172.

Quenchant separation module 20 enables separation of process fluid 112 stored in process storage tanks 110*a*, 110*b* into a first solution of a first predetermined concentration of PAG and a second solution of a second predetermined concentration of PAG. In a preferred embodiment, the first solution has a concentration of PAG is 50%, and the second solution has a concentration of PAG of less than approximately 2%. The first solution is referred to as a heavy phase liquid, and the second solution is referred to as a light phase liquid. Quenchant separation module 20 includes a separation circuit including a coalescer feed pump 180 which generates a fluid flow through flow meter 182. Fluid flow output from flow meter 182 is input to a pair of filters 184*a*, 184*b* through a 3-way valve 188 which diverts flow from one filter 184*a*, 184*b* to the other filter through manual operation of the valve. Fluid output from filters 184*a*, 184*b* passes through check valves 190*a*, 190*b*, respectively, into a heat exchanger 192. Fluid input to heat exchanger 192 is typically at or slightly above ambient temperature. Heat exchanger 192 elevates the temperature of the fluid. Fluid output from heat exchanger 192 is input to a heater 194 which further elevates the temperature of the input fluid.

Heater 194 includes a pair of thermocouples 198, 200 which output signals to controller 34 that vary in accordance with the temperature of the solution. Controller 34 generates control signals to operate heater 194. Thermocouple 198 operates as a high limit thermocouple and is used by controller 34 to determine when to deactivate heater 194 because the operating temperature is outside a predetermined range. Thermocouple 200 provides information which is used to effect process control of quenchant separation module 20 as will be described in greater detail herein.

Heat exchanger 192 and heater 194 operate to effect thermal separation of the incoming PAG fluid. In order to provide more accurate separation, a coalescer 202 receives fluid at an elevated temperature and outputs a light phase solution on light phase output line 204 and a heavy phase solution on heavy phase output line 206. The light phase liquid, as described above, preferably is a solution containing less than approximately 2% PAG. The heavy phase liquid is preferably a solution containing a approximately 50% PAG.

The heavy phase liquid in heavy phase output line 206 passes through a flow meter 210 which generates an output signal to controller 34 that varies in accordance with the flow rate of the heavy phase liquid. The heavy phase liquid also flows through flow control valve 212 which receives control signals from controller 34, as will be described in detail herein, to vary the output flow rate of the heavy phase. The heavy phase liquid then flows through an exchange unit 214 of heat exchanger 192 so that the heavy phase liquid at an elevated temperature may be cooled and the heat reused to elevate the temperature the incoming solution. The heavy phase liquid is output through exchanger unit 214 and input to PAG tank 160 through flow block valve 216 and check valve 172 on PAG return line 27. Controller 34 operates flow block valve 216 in accordance with electrical signals received from thermocouple 218 during a purge cycle, as will be described in detail herein.

The light phase liquid output by coalescer 202 on light phase output line 204 similarly passes through a flow meter 220 which outputs an electrical signal to controller 34 in accordance with the flow rate of the light phase liquid. As will be described herein in greater detail, controller 34 generates control signals to control the output flow of the light phase fluid from coalescer 202 through flow control valve 222. The light phase liquid is then input to a second heat exchange unit 224 to transfer heat from the light phase liquid to the incoming fluid in order to cool the light phase liquid and to elevate the temperature of the incoming fluid. From the exchange unit 224, the light phase fluid flows through flow block valve 226 and into water storage tanks 134*a*, 134*b* through check valve 228 on water return line 25.

In addition to the input circuit described above, quenchant separation module 20 includes a pressure relief line 230 between coalescer feed pump 180 and flow meter 182 to relieve pressure through pressure relief valve 232. Pressure relief occurs by diverting fluid into purge line 32 to recirculate process fluid 112 back to process fluid storage tanks 110*a*, 110*b* through check valve 126. A second pressure relief line 236 is inserted between heater 194 and coalescer 202 to relieve excess pressure through relief valve 234. Pressure relief occurs by diverting fluid into purge line 32 to recirculate process fluid 112 back to process fluid storage tanks 110*a*, 110*b* through check valve 126.

Controller 34 can configure the valves of quenchant management system 10 to provide a purge cycle so that any residual fluid from the previous cycle still in quechant separation module 20 can be returned to process storage tanks 110a, 110b. The purge cycle also enables sufficient preheating of the heat exchanger 192 and heater 194 to ensure proper thermal separation prior to dispensing the respective heavy and light phase liquids to PAG storage tank 160 or water storage tanks 134a, 134b. During the purge cycle, controller 34 generates control signals to open flow block valves 238, 240 to divert the heavy and light phase liquids back to process storage tanks 110a, 110b through purge line 32. Controller 34 maintains the purge cycle and monitors the signal output by thermocouple 218, which varies in accordance with the temperature of fluid output by coalescer 202. Once the temperature of the fluid output from coalescer 202 reaches a predetermined threshold, preferably approximately 185° Fahrenheit, controller 34 outputs a control signal to open flow block valves 226, 216 and closes flow block valves 138, 140 to enable the heavy phase and light phase fluids to flow into the respective PAG storage tank 160 and water storage tanks 134a, 134b.

To summarize the operation of the fluid flows between the respective systems, FIG. 3 provides a process operation table which refers by reference number to the flow block valves and pumps which controller 34 opens and activates, respectively, to initiate a desired fluid transfer operation. It should be noted that in the process operation table of FIG. 3, multiple operations, particularly agitation, can occur in conjunction with transfer processes.

Of particular interest in the present invention is obtaining predetermined PAG concentrations in the heavy phase and light phase liquids outputs by coalescer 202. As is known to those skilled in the art, the following equations describe a relationship between the concentration by percentage and volumetric flow rate in gallons per minute (GPM) of the fluid incoming to quenchant separation module 20, the heavy phase liquid, and the light phase liquid:

$$Q_H = \frac{Q_I [C_I - C_L]}{[C_H - C_L]} \quad (1)$$

$$Q_L = Q_I - Q_H \quad (2)$$

where
$Q_H$=heavy phase volumetric flow rate (GPM),
$Q_L$=light phase volumetric flow rate (GPM),
$Q_I$=light phase volumetric flow rate (GPM),
$C_I$=incoming fluid concentration (%),
$C_H$=heavy phase concentration (%), and
$C_L$=light phase concentration (%).

From Equation 1, it can be seen that because the heavy phase $C_H$ and light phase $C_L$ concentrations are predetermined based on the desired concentration, both can be treated effectively as constants. The incoming concentration $C_I$ is input to controller 34 from process refractometer 124. The volumetric flow rates $Q_I$, $Q_H$, and $Q_L$ are input to controller 34 from flow meters 182, 210, and 220. Referring to Equation 1, because all variables on the right side of Equation 1 are either predetermined as constants or measured and input to controller 34, the desired heavy phase volumetric flow rate $Q_H$ can be determined. Controller 34 outputs control signals to flow valve 212 in order to adjust the heavy phase volumetric flow rate output by coalescer 202 to equal the calculated $Q_H$. Flow meter 210 outputs signals to controller 34 which vary in accordance with the heavy phase volumetric flow rate output by coalescer 202.

As seen from Equation 2, the light phase volumetric flow rate $Q_L$ is simply the difference between the incoming volumetric flow rate $Q_I$ and the heavy phase volumetric flow rate $Q_H$. The light phase volumetric flow rate output by coalescer 34 can be similarly determined and adjusted. Accordingly, controller 34 generates a control signal to flow control valve 222 in order to adjust the light phase volumetric flow rate output by coalescer 202 to equal the calculated $Q_L$. Flow meter 220 outputs electrical signals to controller 34 which vary in accordance with the volumetric flow rate output by coalescer 202. Controller 34 thus can continue to determine the desired volumetric flow rate output by coalescer 202 using flow meters 210 and 220 for the respective heavy and light phases and also generate control signals to flow control valves 212 and 222 to provide the desired, respective heavy and light phase volumetric flow rates.

From Equations 1 and 2, one skilled in the art will recognize that the input flow $Q_I$ is related to the light phase flow rate $Q_L$ and the heavy phase flow rate $Q_H$. Accordingly, one skilled in the art will recognize that by monitoring the flow rate $Q_L$ on the light phase output line using flow meter 220, the heavy phase flow rate $Q_H$ can be controlled in accordance with the measured light phase volumetric flow rate. More particularly, the output flow rate of one of the light phase output line 204 or the heavy phase output line 206 can be calculated based on the output flow rate of the other of the light phase output line 204 or the heavy phase output line 206. This information can thus be used to determine a desired flow rate in order to vary the respective flow control valves 212, 222, as required.

Figure 4:
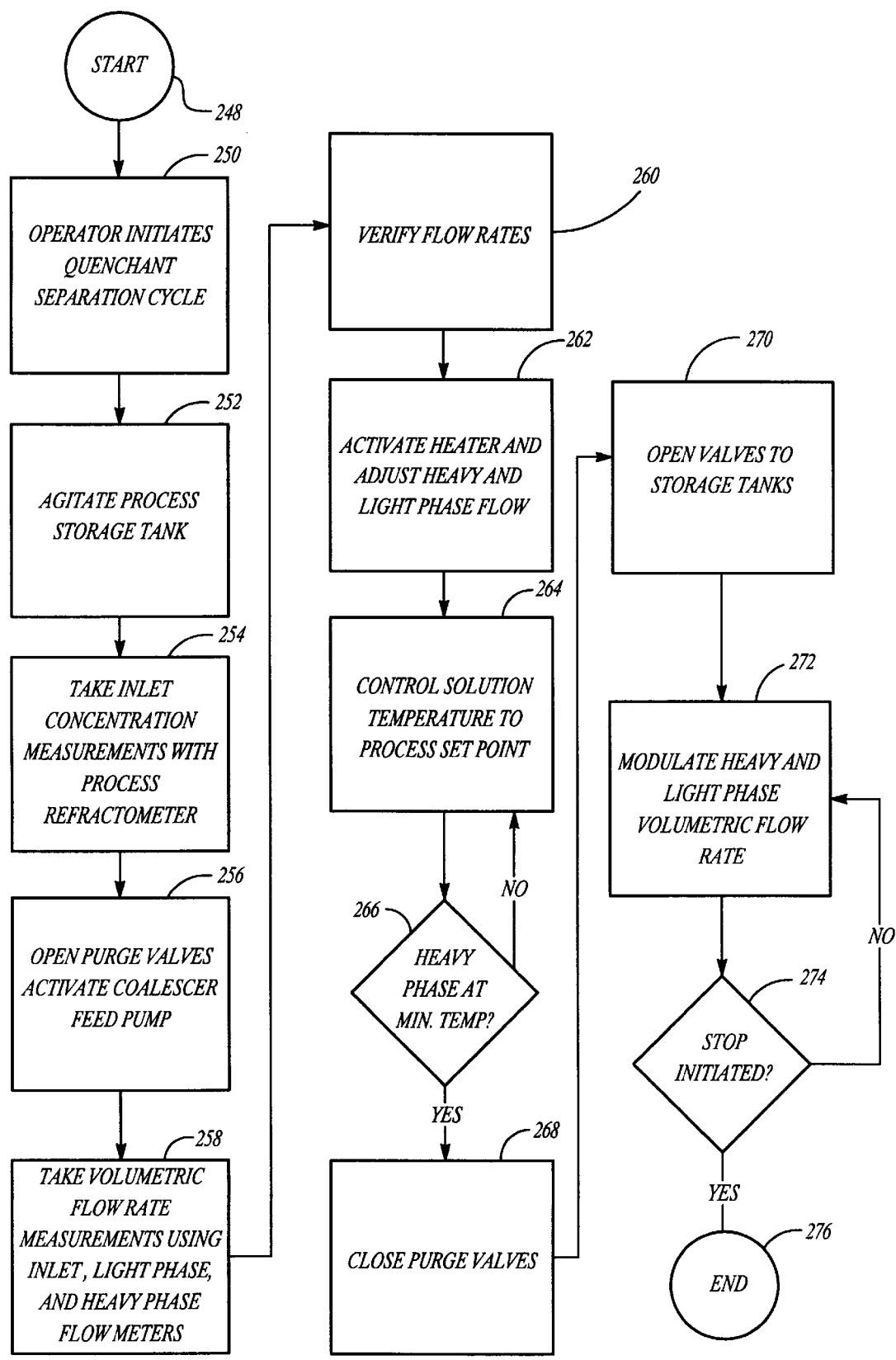
FIG. 4 is a flow diagram detailing operation of the quenchant separation module of FIGS. 1 and 2.

FIG. 4 depicts a block diagram of the process for separating polyalkylene glycol (PAG) from water as implemented in the quenchant management system 10 described herein. The quenchant separation process is comprised of 3 cycles: (1) the agitation cycle, (2) the purge cycle, and (3) the separation cycle. Control begins at start block 248 and proceeds to block 250 where an operator initiates a quenchant separation cycle from a control panel. Typically, the quenchant separation cycle is initiated when (1) the level of process fluid 112 in process storage tanks 110a, 110b becomes too high, (2) all the quench solution has been transferred to process tanks 110a, 110b from quench tank 36, (3) PAG storage tank 160 is low or empty when PAG is required to increase the concentration of the quench solution within quench tank 36, or (4) water storage tank 134a, 134b is low or empty and when water is required in quench tank 36 and/or rinse tank 82. It should be noted that while block 250 refers to operator initiation, one skilled in the art will recognize that controller 34 receives sufficient information from the various sensors throughout quenchant management system 10 to automatically initiate the quenchant separation cycle. Upon initiation of the quenchant separation cycle, control proceeds to block 252 where process storage tanks 110a, 110b are agitated to provide a homogenous process solution 112. Following agitation, control proceeds to block 254 where the controller 34 begins to take concentration reading from the process refractometer 124.

Control next proceeds to block 256 which carries out a purge cycle. The purge cycle allows for inlet and outlet flows through coalescer 202 to stabilize and for purging fluid from prior separation cycles. The purge cycle also allows for the solution in the quenchant separation module 22 to preheat to the desired operating temperature. During the purge cycle, the agitation process commenced at block 252 optionally continues. Controller 34 initiates operation of coalescer feed pump 180 and generates control signals to open flow block valves 238 and 240 to direct solution output by coalescer 202 back to process storage tanks 110a, 110b through purge line 320. Control next proceeds to block 258 where controller 34 begins to take continuous flow rate measurements using input signals from flow sensors 182, 210, and 220.

At block 260, controller 34 verifies flow rates taken at block 258. Once the flow rates have been verified, controller 34 activates heater 194 as shown at block 262 and adjusts the heavy and light phase flow rates based on inlet concentration and inlet flow rates. The heavy and light phase volumetric flow rates are measured by the heavy and light phase flow meters 210, 220. As shown at blocks 264, controller 34 commences taking temperature measurements using the output signals from process thermocouple 200 and heavy phase thermocouple 218. At block 266, controller 34 test the temperature of the heavy phase to determine if it is above a predetermined minimum. If below a minimum control returns to block 264. If above a predetermined minimum control proceeds to block 268.

Once the heavy phase liquid reaches a predetermined threshold, control advances to block 268 where controller 34 generates control signals to close flow block purge valves 238, 240. At block 270, controller 234 generates electrical control signals to open flow block valves 216 and 226. This operation enables the heavy and light phase liquids to flow to the respective storage tanks as shown at blocks 280 and 282, respectively.

After controller 34 has opened the valves to the respective storage tanks, control proceeds to block spacing 272 where controller 34 continues to modulate heavy and light phase volumetric flow rates, as will be described above herein, as shown at block 272. Control then proceeds to block 274 where a test determines whether a stop signal has been detected. The stop signal may be automatically generated at the end of a cycle or in response to other control signals or may be operator generated. If no stop has been initiated, control returns to block 272 where controller 34 continues to modulate the heavy and light phase volumetric flow rates. If a stop has been initiated, control proceeds to end terminator 276.

In accordance with a preferred embodiment of the present invention, quench tank 36 has a capacity to hold up to 25,700 gallons of quench solution 40. Quench tank pump 42 preferably is a 400 gallon per minute (GPM) pump operating at 54 pounds per square inch of pressure (PSI) and outputs 20 horsepower (HP) at 3450 revolutions per minute (RPM). Filter 46 preferably is typically a 10 micron bag filter capable of processing up to 400 GPM. Process refractometer 48 outputs a signal that varies in accordance with the PAG concentration and is preferably a K-Patents, Part No. PR-01-S. Rinse tank 82 preferably contains up to 10,583 U.S. gallons of rinse solution. Rinse tank pump 90 and filter 94 share the same characteristics as described with respect to quench tank pump 42 and filter 46.

Each process storage tanks 110a, 110b and water storage tanks 134a, 134b preferably contains up to 14,000 gallons of process solution. Process storage tank pump 122 and water storage tank pump 146 preferably are 400 GPM pumps at 25 PSI and provide a power output of 10 HP at 1,750 RPM. Process refractometer 124 preferably is K-Patents, Part No. PR-01-S. PAG storage tank 160 preferably contains up to 5,000 gallons of PAG solution, and PAG storage tank pump 166 preferably has an output of 70 GPM at 45 PSI and a power output of 5 HP at 3,450 RPM. Coalescer feed pump 180 preferably outputs 5 GPM at 90 PSI and provides a power output of 2 HP at 3,450 RPM. Filters 184a, 184b, are preferably 5 micron filters. Heater 194 is preferably Watlow, Part No. 705-98B11151.

Coalescer 202 preferably has a total system flow rate of 10 GPM at an operating pressure of 50 to 100 PSI and an operating temperature of 195° Fahrenheit. The light phase liquid output comprises water having a concentration of less than approximately 2% PAG at a specific gravity of 0.96 at 190° Fahrenheit. The heavy phase liquid output of coalescer 202 is preferably a 50% PAG solution having a specific gravity of greater than 0.96 at 190° Fahrenheit. An example of such a coalescer may be found with to reference liquid/liquid coalescer model number TSC-TB3-CS manufactured by Osmonics, Inc.

While specific embodiments have been shown and described in detail to illustrate the principles of the present invention, it will be understood that the invention may be embodied otherwise without departing from such principles. For example, one skilled in the art will readily recognize from such discussion and from the accompanying drawings and claims that various changes, modifications and variations can be made therein without departing from the spirit and scope of the invention as described in the following claims.

What is claimed is:

1. An apparatus for separating an input fluid into a first phase liquid and a second phase liquid, the first phase liquid having a desired concentration of a selected component, comprising:
    a device for measuring a concentration of the component in the input fluid;
    an input flow meter for determining an input flow rate of the input fluid;
    a separator for separating the input fluid into a first output fluid comprising the first phase liquid and a second output fluid comprising the second phase liquid, each output fluid having a flow rate;
    a first output flow meter for determining the flow rate of one of the first and second output fluids;
    a first flow valve for varying the flow rate of the first output fluid; and
    a controller for adjusting the first flow valve in accordance with the input flow rate, the input fluid concentration, and the desired concentration of the selected component.

2. The apparatus of claim 1 wherein the first output flow meter determines the output flow rate of the first phase liquid.

3. The apparatus of claim 1 wherein the first output flow meter determines the output flow rate of the second phase liquid.

4. The apparatus of claim 1 further comprising:
    a second flow meter for determining the flow rate of the other output fluid; and
    a second output flow valve for varying the flow rate of the second output fluid;
    wherein the a controller adjusts the second flow valve in accordance with the first flow rate.

5. The apparatus of claim 4 wherein the first output flow meter determines the output flow rate of the first phase liquid.

6. The apparatus of claim 4 wherein the second output flow meter determines the output flow rate of the second phase liquid.

7. The apparatus of claim 1 wherein the separator comprises a coalescer having an input and a pair of outputs, the input receiving the input fluid, and one output providing the first phase liquid and the other output providing the second phase liquid.

8. The apparatus of claim 1 further comprising a heating unit to elevate the temperature of the input fluid prior to input to the separator.

9. The apparatus of claim 8 wherein the heating unit comprises an electrically powered heater.

10. The apparatus of claim 9 wherein the heating unit further comprises a heat exchanger.

11. The apparatus of claim 10 wherein the first and second output fluids are at a temperature above ambient temperature, and at least one of the first and second output fluids are circulated through the heat exchanger to provide a heat input to the heat exchanger.

12. The apparatus of claim 8 further comprising a filter for filtering the input fluid prior to input to the heating unit.

13. The apparatus of claim 8 wherein the separator comprises a coalescer having an input and a pair of outputs, the input receiving the input fluid, and one output providing the first phase liquid and the other output providing the second phase liquid.

14. The apparatus of claim 1 wherein the selected component is polyalkylene glycol (PAG).

15. The apparatus of claim 14 wherein the first phase liquid is a heavy phase liquid comprising approximately 50% PAG by volume.

16. The apparatus of claim 14 wherein the second phase liquid is a light phase liquid comprising water and less than 2% PAG by volume.

17. The apparatus of claim 1 wherein the controller varies the output flow rate of the first output fluid in accordance with the following equation:

$$Q_H = \frac{Q_I[C_I - C_L]}{[C_H - C_L]}$$

where $Q_H$ is the flow rate of the first phase output, $Q_I$ is the flow rate of the input fluid, $C_I$ is the concentration of the input fluid, $C_H$ is the desired concentration of the first phase, and $C_L$ is a desired concentration of the second phase.

18. The apparatus of claim 17 wherein the controller varies the output flow rate of the second output fluid in accordance with the following equation:

$$Q_L = Q_I - Q_H$$

where $Q_L$ is the flow rate of the second phase output.

19. A quenchant management system comprising:
a quench solution comprised of a predetermined concentration of a component;
a quench tank for storing the quench solution, wherein an object to be quenched is immersed in the quench solution;
a rinse tank for storing rinse solution substantially comprised of water, the object being immersed in the rinse solution after being immersed in the quench solution;
a quenchant separation module for receiving as input the quench solution, the quenchant separation module separating the quench solution into a first phase liquid having a second predetermined concentration of the component and a second phase liquid having a minimal concentration of the component;
a component storage tank for storing the first phase liquid output by the quenchant separation module;
a water storage tank for storing the second phase liquid output by the quenchant separation module;
a concentration measurement device for measuring the concentration of the component in the quench solution input to the quenchant separation module;
a flow sensor for measuring an input flow rate of the quench solution input to the quenchant separation module;
a flow sensor for measuring an output flow rate of one of the first and second phase liquids output by the quenchant separation module;
a flow valve for varying the output flow rate of the first phase liquid;
a controller for directing operation of the quenchant system, the controller varying an output flow rate of the first phase liquid in accordance with the input fluid concentration, the input flow rate, and the output flow rate of the one of the first and second phase liquids to maintain the second predetermined concentration of the component.

20. The apparatus of claim 19 wherein the one of the liquids is the first phase liquid.

21. The apparatus of claim 19 wherein the one of the liquids is the second phase liquid.

22. The apparatus of claim 19 wherein the quenchant separation module includes a coalescer for receiving the input fluid and applying a coalescing operation to separate the quench solution into the respective first and second phase liquids.

23. The apparatus of claim 22 wherein the quenchant separation module includes a heater for elevating the temperature of the quench solution to effect thermal separation of the quench solution.

24. The apparatus of claim 22 wherein the heater includes a heat exchanger for elevating the temperature of the quench solution.

25. The apparatus of claim 22 wherein the second phase liquid is a light phase liquid comprising water and less than 2% PAG by volume.

26. The apparatus of claim 22 wherein the controller varies the output flow rate of the first phase liquid in accordance with the following equation:

$$Q_H = \frac{Q_I[C_I - C_L]}{[C_H - C_L]}$$

where $Q_H$ is the output flow rate, $Q_I$ is the input flow rate, $C_I$ is the concentration of the input fluid, $C_H$ is the desired concentration of the first phase, and $C_L$ is a desired concentration of the second phase.

27. The apparatus of claim 26 wherein the controller varies the output flow rate of the second phase liquid in accordance with the following equation:

$$Q_L = Q_I - Q_H$$

where $Q_L$ is the second output flow rate.

28. The apparatus of claim 19 further comprising:
a second flow sensor for measuring an output flow rate of the second phase liquid output by the quenchant separation module;
a second flow valve for varying the second output flow rate;
wherein the controller varies the second output flow rate in accordance with the first output flow rate.

29. The apparatus of claim 28 wherein the first phase liquid is a heavy phase liquid comprising approximately 50% PAG by volume.

* * * * *